(12) United States Patent
Bender et al.

(10) Patent No.: US 10,060,040 B2
(45) Date of Patent: Aug. 28, 2018

(54) METHODS AND SYSTEMS FOR CONTROLLING IMPURITY METAL CONCENTRATION DURING METALLURGIC PROCESSES

(71) Applicant: BASF SE

(72) Inventors: Jack Bender, Corona de Tucson, AZ (US); Nathan C. Emmerich, Tucson, AZ (US)

(73) Assignee: BASF SE, Ludwigshafen (DE)

( * ) Notice: Subject to any disclaimer, the term of this patent is extended or adjusted under 35 U.S.C. 154(b) by 408 days.

(21) Appl. No.: 14/640,245

(22) Filed: Mar. 6, 2015

(65) Prior Publication Data

US 2015/0252486 A1   Sep. 10, 2015

Related U.S. Application Data

(60) Provisional application No. 61/949,502, filed on Mar. 7, 2014.

(51) Int. Cl.
| | |
|---|---|
| *C25C 1/12* | (2006.01) |
| *C22B 3/04* | (2006.01) |
| *C25C 7/04* | (2006.01) |
| *C22B 3/02* | (2006.01) |
| *C22B 3/38* | (2006.01) |
| *C22B 15/00* | (2006.01) |

(52) U.S. Cl.
CPC .............. *C25C 1/12* (2013.01); *C22B 3/0043* (2013.01); *C22B 3/02* (2013.01); *C22B 3/04* (2013.01); *C22B 15/0065* (2013.01); *C25C 7/04* (2013.01); *Y02P 10/234* (2015.11); *Y02P 10/236* (2015.11)

(58) Field of Classification Search
None
See application file for complete search history.

(56) References Cited

U.S. PATENT DOCUMENTS

| | | | | | |
|---|---|---|---|---|---|
| 3,767,543 | A | * | 10/1973 | Hazen ...................... | C22B 3/10 205/582 |
| 3,966,569 | A | * | 6/1976 | Reinhardt .............. | B01D 11/04 205/581 |
| 4,061,564 | A | | 12/1977 | De Schepper et al. | |
| 4,067,802 | A | | 1/1978 | Cronberg et al. | |
| 4,113,848 | A | * | 9/1978 | Parker ...................... | C01G 3/00 203/33 |

(Continued)

FOREIGN PATENT DOCUMENTS

| | | |
|---|---|---|
| DE | 30 12 246 A1 | 10/1980 |
| EP | 562709 | 2/1993 |

(Continued)

OTHER PUBLICATIONS

Ismael et al, Iron recovery from sulphate leach liquours in zinc hydrometallurgy, Minerals Engineering, vol. 16, Issue 1, Jan. 2003, pp. 31-39 (Year: 2003).*

(Continued)

*Primary Examiner* — Harry D Wilkins, III
(74) *Attorney, Agent, or Firm* — Lowenstein Sandler LLP

(57) ABSTRACT

Reagent compositions, methods and systems for reducing concentrations of impurity metals during metallurgic processes. Certain methods and systems in particular pertain to control of iron concentration in copper electrowinning electrolyte solutions.

10 Claims, 7 Drawing Sheets

(56) References Cited

U.S. PATENT DOCUMENTS

| | | | |
|---|---|---|---|
| 4,115,512 | A | 9/1978 | Kerfoot |
| 4,157,946 | A | 6/1979 | Hyvarinen |
| 4,334,999 | A | 6/1982 | Cornwell |
| 4,444,666 | A | 4/1984 | Hiroshi |
| 4,560,453 | A | 12/1985 | Hoffman et al. |
| 4,789,444 | A * | 12/1988 | Watanabe ................ C25C 1/00 205/572 |
| 4,820,417 | A | 4/1989 | Buchmeier et al. |
| 4,834,951 | A | 5/1989 | Schwab et al. |
| 4,957,714 | A | 9/1990 | Olafson et al. |
| 5,039,496 | A | 12/1991 | Kehl et al. |
| 5,093,090 | A | 3/1992 | Guerriero et al. |
| 5,133,948 | A | 7/1992 | King et al. |
| 5,366,715 | A | 11/1994 | Dreisinger et al. |
| 5,573,739 | A | 11/1996 | Baboudjian et al. |
| 5,582,737 | A | 12/1996 | Gula et al. |
| 5,632,963 | A | 5/1997 | Schwab et al. |
| 5,783,057 | A | 7/1998 | Tomita et al. |
| 5,948,264 | A | 9/1999 | Dreisinger et al. |
| 8,349,187 | B2 | 1/2013 | Riveros |
| 2006/0144717 | A1 | 7/2006 | Marsden et al. |

FOREIGN PATENT DOCUMENTS

| | | |
|---|---|---|
| WO | 91/16465 | 10/1991 |
| WO | 97/44499 | 11/1997 |
| WO | 2015/132654 | 9/2015 |

OTHER PUBLICATIONS

International Search Report and Written Opinion for International Application No. PCT/IB2015/000291 dated Aug. 18, 2015, 16 pgs.
Cyanex 272 Extractant Product Sheet, Cytec Industries, Inc. 2008, 16 pages.
Cyanex 923 Extractant Product Sheet, Cytec Industries, Inc. 2008, 16 pages.
Demopoulos, G.P., et al., Iron(III) Removal From Base-Metal Electrolyte Solutions by Solvent Extraction, *Hydrometallurgy*, vol. 12 1984, 299-315.
Demopoulos, G.P., et al., Bench Scale and Mini-Pilot Plant Investigations on the Selective Removal of Iron from Zinc Process Solutions by Solvent Extraction, *Iron Control and Disposal, Canadian Institute of Mining, Metallurgy and Petroleum*, Montreal, Quebec, Canada, ISBN 0-919086-71-3 1996, 395-416.
Ismael, M.R.C., et al., Iron recovery from sulphate leach liquors in zinc hydrometallurgy, *Minerals Engineering* vol. 16 2003, 31-39.
Principe, F.T., et al., Solvent Extraction Removal of Iron from Zinc Process Solutions Using Organophosphorus Extractants, *EPD Congress, The Minerals, Metals & Materials Society* 1998, 267-287.
Xue, S.S., et al., Control of Iron in Copper Electrolyte Streams with a New Monophosphonic/Sulphonic Acid Resin, *Minerals & Metallurgical Processing* vol. 18, No. 3 Aug. 2001, 1337.
Dreisinger, D.B., et al., The Solvent Extraction and Ion Exchange Removal of As, Sb, and Bi from Copper Sulphate-Sulphuric Acid Solutions, Hydrometallurgy 1999, 802-815.

* cited by examiner

METHODS AND SYSTEMS FOR CONTROLLING IMPURITY METAL CONCENTRATION DURING METALLURGIC PROCESSES

CROSS-REFERENCE TO RELATED APPLICATIONS

This application claims priority to U.S. Provisional Application No. 61/949,502, filed Mar. 7, 2014, the contents of which are incorporated herein by reference.

TECHNICAL FIELD

The present invention relates generally to the field of extractive metallurgy. In particular, the present invention relates to methods for controlling iron concentration during various mining processes, including those involving solvent extraction-electrowinning systems.

BACKGROUND

The importance of copper, as well as a variety of other metals, has led to a continuing search for more efficient and productive procurement methods. One method of copper extraction is a process of leaching, coupled together with solvent extraction, and finally copper production by electrowinning. Leaching is typically carried out by stacking the ore in piles on a prepared pad or by stacking it in a small canyon. A solution of an acid (e.g. sulfuric acid) is then applied, and as the acid solution is trickled down through the heap, copper is dissolved from the rock. The resultant copper-bearing solution ("pregnant leach solution" or "PLS") is collected, and then transferred to the solvent extraction plant, where it is contacted by vigorous mixing with an organic solution comprising an extractant dissolved in a kerosene-like hydrocarbon diluent. In this extraction, the copper (as cupric ion) is transferred to the organic phase, where it forms a chelate-type complex with the extractant. After contact, the mixture of aqueous and organic is allowed to separate. The copper-depleted aqueous solution ("raffinate") exits the solvent extraction plant, and the organic is transferred to stripping, where it is contacted with a strong acid solution. In stripping, a portion of the cupric ion is transferred to the aqueous phase and protons are transferred to the organic. The now copper-depleted organic is returned to extraction for re-use.

The copper-rich aqueous strip solution ("pregnant" or "rich electrolyte") is then transferred to electrowinning ("EW"). In electrowinning, copper is plated as metal from solution at the cathode, and water is broken down at the anode to form oxygen and protons as acid.

One problem with current technology relates to iron, and possibly other undesired metals, concentration buildup in the electrowinning system. Iron is transferred from the pregnant leach solution to the EW circuit either as entrained aqueous in the organic phase or by extraction and subsequent stripping using hydroxy oximes. It should be noted that sometimes a minimum amount of iron is necessary in electrowinning solutions for various reasons. One such reason is to control the effects of manganese. When no iron is present, manganese is oxidized to permanganate at the anode as copper is plated at the cathode. When the lean electrolyte containing permanganate is returned to stripping, the permanganate, which is a strong oxidant, attacks the organic phase and damages it. However, concentrations of iron over a minimum threshold are also detrimental.

Having high concentrations of iron in electrowinning systems causes several problems, one of the most significant being loss of current efficiency. Current efficiency reflects the portion of the total supplied amps actually being used to plate the copper. In order to reduce the concentration of iron, electrolyte may be bled from the system and discarded. This discarded electrolyte solution unfortunately also contains a relatively high concentration of copper, added cobalt, and sulfuric acid, which means that these components are unintentionally lost along with the iron. The volume of this discarded electrolyte must be replaced with fresh sulfuric acid, fresh water, and cobalt. For example, bleeding electrolyte results in the reduction of cobalt concentration which is added to protect lead anodes, which can be a large expense in an electrowinning plant. Thus, in addition to the cost incurred by the drop in current efficiency, there is an additional cost in terms of lost auxiliary reagents associated with bleeding the system to control the iron concentration.

Several methods have been investigated for the removal of iron from acid sulfate systems in an effort to reduce the need for electrolyte bleeding. The most common method has been the use of specialty ion exchange resins, with the FENIX Iron Control system as the only resin currently being promoted to reduce iron concentrations in electrowinning systems. The resin utilized in this system is a sulfonated monophosphonic acid substituted crosslinked polymer. This resin material is not readily available, and is therefore associated with a very high cost. This system also has the disadvantage in that it does not offer a continuous process. That is, iron concentration cannot be continuously reduced without interruption in a given ion exchange column. As a result, several columns must be available so that some columns may be used while others are eluted and regenerated for use later on. Furthermore, the stripping conditions are relatively severe, therefore requiring highly specialized equipment, and thereby further driving up the cost.

As of yet, no solvent extraction technology has been commercially implemented to address the buildup of iron concentration. There is thus a need for methods and/or systems that address one or more of these problems.

SUMMARY

One aspect of the invention pertains to a method of controlling an iron concentration in a copper extraction system. In one or more embodiments, the copper extraction system comprises a copper electrowinning station. In some embodiments, the method comprises introducing a copper rich electrolyte into the copper electrowinning station and removing a copper lean electrolyte from the copper electrowinning station. In one or more embodiments, the method comprises then introducing a copper rich electrolyte into the copper electrowinning station and removing a copper lean electrolyte from the copper electrowinning station. Next, the method may further comprise determining an iron transfer to the copper electrowinning station. In some embodiments, the method also comprises removing a bleed portion of the electrolyte solution from the copper electrowinning station at a bleed stream rate, and introducing bleed portion into an iron extraction stage that contacts the bleed portion with an organic solvent comprising an extraction agent comprising a monoalkyl phosphate ester having a structure represented by:

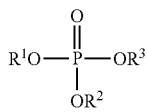

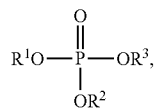

wherein $R^1$ comprises a linear, branched or cyclic alkyl or aryl group, and $R^2$ and $R^3$ are each H. In one or more embodiments, the method further comprises determining an iron removal of the iron extraction stage. In some embodiments, the bleed stream rate is proportional to the ratio of the iron transfer and the iron removal.

In one or more embodiments, determining the iron transfer comprises measuring a difference in iron concentration entering and exiting the copper electrowinning station. In some embodiments, the copper extraction system further comprises an extraction stage in which copper is extracted into an organic phase to provide a loaded organic, and a strip stage in which copper is stripped from the organic phase to provide a stripped organic, and determining the iron transfer comprises calculating the sum of: an iron strip rate determined by the difference in iron concentration between the loaded organic and the stripped organic; and an iron entrainment rate determined by an iron concentration in an aqueous entrainment in the organic phase.

In some embodiments, the iron transfer is an iron amount per unit of time, an iron amount, an iron concentration or an iron concentration per unit of time. In one or more embodiments, the iron removal is an iron amount per unit of time, an iron amount, an iron concentration or an iron concentration per unit of time. In some embodiments, one or more of $R^{1-3}$ in the monoalkyl phosphate ester is a branched or linear $C_6$-$C_{12}$ alkyl group. In one or more embodiments, one or more of $R^{1-3}$ in the monoalkyl phosphate ester is a branched or linear $C_6$-$C_9$ group. In some embodiments, the monoalkyl phosphate ester comprises iso-octyl phosphoric acid, 2-ethylhexyl phosphoric acid, octophenyl phosphoric acid or nonylphenyl phosphoric acid. In one or more embodiments, the monoalkyl phosphate ester comprises iso-octyl phosphoric acid.

In some embodiments, the method further comprises contacting bleed portion with a modifier. In one or more embodiments, the modifier comprises a $C_8$-$C_{16}$ linear, branched or cyclic or aryl alcohol. In some embodiments, the modifier comprises tridecanol. In some embodiments, the extraction agent further comprises a dialkyl phosphate ester. In one or more embodiments, the monoalkyl phosphate ester and dialkyl phosphate ester are present in a molar ratio of about 20:1 to 0.1:1. In some embodiments, contacting the bleed portion with the organic solvent provides an iron-loaded organic, and the method further comprises stripping the iron from the iron-loaded organic into an iron-rich strip solution, and leaching copper ore with the iron-rich strip solution.

Another aspect of the invention pertains to a system for continuous control of an impurity metal concentration during a metal recovery process. In one or more embodiments, the system comprises an impurity metal extraction stage comprising:
a. a mixer comprising
  i. a first input connected to a source of an aqueous impurity-rich electrolyte solution;
  ii. a second input connected to a source of an organic impurity-lean solution comprising an extraction agent comprising monoalkyl phosphate ester having a structure represented by wherein $R^1$ comprises a linear, branched or cyclic alkyl or aryl group, and $R^2$ and $R^3$ each comprise H; and
b. a separator in fluid communication with the mixer, the separator comprising
  i. a first output for an aqueous impurity-lean electrolyte solution to exit the separator;
  ii. a second output for an organic impurity-loaded solution to exit the separator.
In some embodiments, the system further comprises:
c. a second mixer comprising
  i. a first input connected to the output for the organic impurity-loaded solution in the first separator;
  ii. a second input connected to a sulfuric acid source; and
d. a second separator in fluid communication with the second mixer, the second separator comprising
  i. a first output for an organic impurity-stripped solution to exit the separator;
  ii. a second output for an impurity-rich raffinate solution to exit the separator.
In one or more embodiments, the system further comprises an electrowinning station comprising
a. a first input connected to the second output of the first separator;
b. a first output connected to the first input of the first mixer.

In some embodiments, the aqueous impurity-rich electrolyte solution also comprises copper. In one or more embodiments, the organic impurity-lean solution further comprises a modifier. In some embodiments, the modifier comprises a $C_8$-$C_{16}$ linear, branched or cyclic or aryl alcohol. In one or more embodiments, the modifier comprises tridecanol. In some embodiments, the first input of the first mixer and the first output of the electrowinning station comprise a continuous feed stream. In one or more embodiments, the input of the electrowinning station and the second output of the first separator continuous comprise a feed stream. In some embodiments, the extraction agent further comprises a dialkyl phosphate ester. In one or more embodiments, the monoalkyl phosphate ester and dialkyl phosphate ester are present in a molar ratio of about 20:1 to 0.1:1. In some embodiments, the system further comprises a leach station wherein ore is leached with the impurity-rich raffinate solution.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Aspects of the invention generally relate to methods, apparatuses and systems for controlling iron or other impurity metal concentration in electrowinning systems. One or more of the embodiments of the invention described herein provide for continuous control over the concentration of iron.

Figure 1:
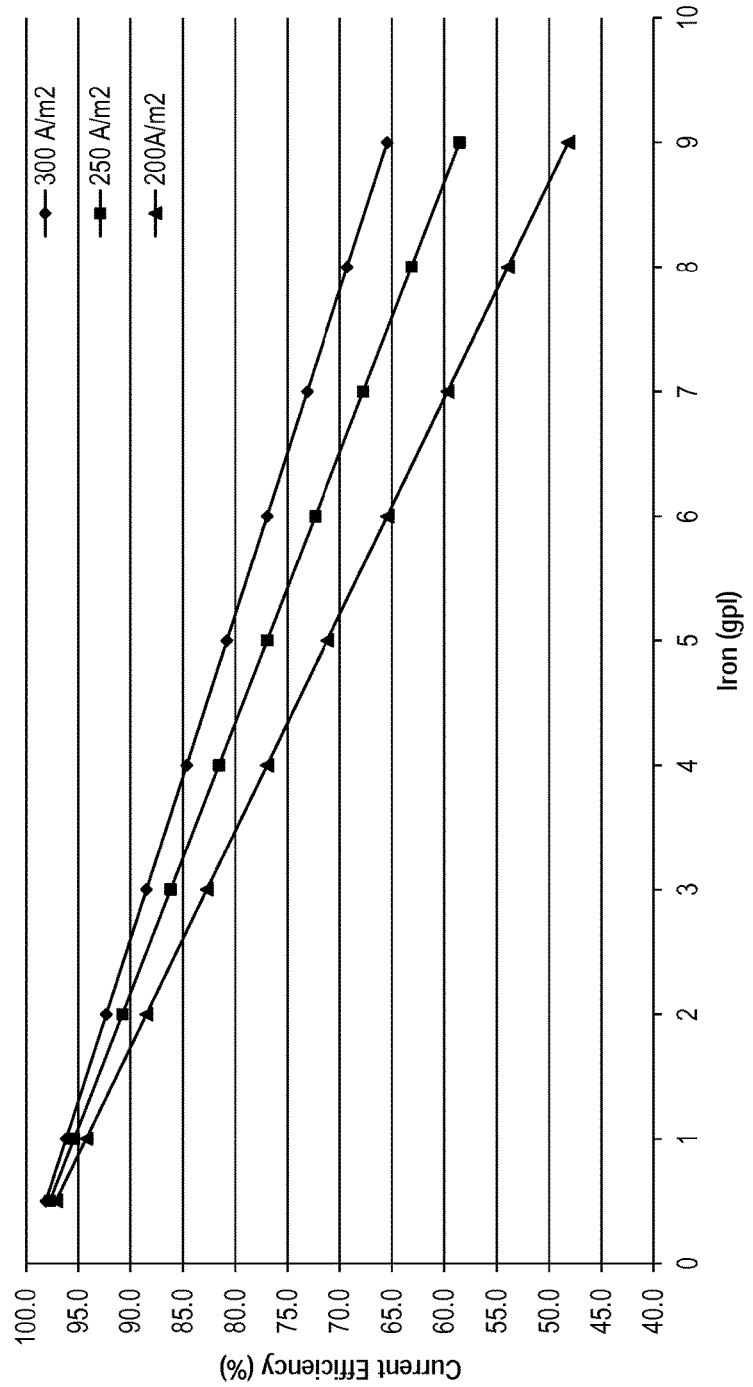
FIG. 1 is a graph showing current efficiency as a function of iron concentration.

As discussed above, having high concentrations of iron in electrowinning systems causes several problems, one of the most significant being loss of current efficiency. FIG. 1 shows current efficiency as a function of iron concentration in the electrolyte for three different current densities (200, 250 and 300 A/m$^2$). These current densities reflect common plant conditions, which tend to run at higher current densities (i.e., 275-300+). As shown in the graph, current efficiency steadily decreases with increasing iron concentration, regardless of the current density. Loss of current efficiency results in wasted energy, which directly translates to higher costs for plating copper. One or more of the methods and systems described herein help to prevent current density loss in electrowinning systems, thereby increasing the efficiency with which copper is plated and ultimately recovered. Additionally, one or more of the methods and systems described herein also reduce or eliminate the need for bleeding the electrowinning electrolyte solution, thereby reducing the cost associated with the loss of copper and other additives.

Processes

Accordingly, a first aspect of the invention pertains to a method of controlling and/or reducing iron (or other impurity metal) concentration during a metal recovery process. Generally, the method comprising contacting an electrolyte solution comprising iron with an extraction agent. The extraction agent may comprise a monoalkyl phosphate ester (also referred to as a monoalkyl acid phosphate or monoalkyl phosphoric acid) having a structure represented by

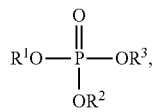

wherein R$^1$ comprises a linear, branched or cyclic alkyl or aryl group, and R$^2$ and R$^3$ each independently comprise H. Aryl groups may be substituted. In one or more embodiments, the second metal comprises iron. Contact of the electrowinning solution with the extraction agent may comprise subjecting the electrowinning solution to a solvent extraction stage.

In one or more embodiments, the extraction agent may comprise more than one component. For example, in some embodiments, the extraction agent may comprise mixtures of mono-, di-, and/or tri-alkyl phosphate esters. In further embodiments, the extraction agent may further comprise a dialkyl phosphate ester. In some embodiments, the monoalkyl and dialkyl phosphate esters are present in a molar ratio of about 20:1 to about 0.1:1, about 10:1 to about 0.2:1, or about 5:1 to about 0.2:1 0.5:1. In one or more embodiments, the extraction agent further comprises a trialkyl phosphate ester. In further embodiments, the trialkyl phosphate ester is selected from the group consisting of tributyl phosphate, trihexyl phosphate ester, trioctyl phosphate ester, and tripentyl phosphate ester.

As discussed above, as copper mining processes are carried out, iron builds up in the electrolyte over time. Chemically, it is possible for low concentrations of iron to be chemically transferred from a pregnant leach solution to the stripped organic during the copper extraction stage and then chemically transferred from the loaded organic to the lean electrolyte in the copper strip stage. Additionally, small droplets of pregnant leach solution or raffinate can remain suspended in the loaded organic phase (LO) as it exits the extraction settler. This entrainment contains iron which is then brought into the electrolyte when the loaded organic and lean electrolyte are mixed in the strip stage. Therefore, in one or more embodiments, the method for controlling iron is a method for controlling an iron concentration in a copper extraction system, wherein the copper extraction system comprises a copper electrowinning station. The method comprises:

a. introducing a copper rich electrolyte into the copper electrowinning station and removing a copper lean electrolyte from the copper electrowinning station;

b. determining an iron transfer to the copper electrowinning station;

c. removing a bleed portion of the electrolyte solution from the copper electrowinning station at a bleed stream rate, and introducing the bleed portion into an iron extraction stage that contacts the bleed portion with an organic solvent comprising an extraction agent comprising a monoalkyl phosphate ester having a structure represented by:

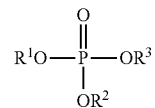

wherein R$^1$ comprises a linear, branched or cyclic alkyl or aryl group, and R$^2$ and R$^3$ are each H; and d. determining an iron removal rate of the iron extraction stage, wherein the bleed stream rate is proportional to the ratio of the iron transfer and the iron removal. In some embodiments, the rate of iron transfer by the iron extraction stage may be adjusted either by adjusting organic/aqueous flow ratios (O/A) or reagent concentration to remove all of the iron from the bleed stream or a sufficient portion of the iron from the bleed stream to remove the required amount of iron. In one or more embodiments, the above process may be carried out with other impurity metals, including, but not limited to, Sb and Sn.

As used herein, "iron transfer" refers to the net amount or rate at which iron enters the copper electrowinning station. For example, the term encompasses any units which convey a rate of iron per unit of time, including an absolute amount per unit of time (e.g., grams per minute) or concentration per unit of time (e.g. g/L per minute). As another example, the term also encompasses an absolute amount (e.g., grams) or concentration (e.g. g/L). In one or more embodiments, the iron transfer is determined by analysis of the iron in the lean electrolyte entering and the rich electrolyte leaving the copper solvent extraction plant (e.g., from the electrowinning station). In one or more embodiments, the difference in these values indicates the concentration of iron that has been transferred. An alternative way of measuring the iron transfer is to use the sum of the iron stripped from the loaded organic (loaded organic minus stripped organic concentration) and the concentration of iron in the aqueous entrainment coming from the extraction stage to the strip stage. Using either method the resultant concentration must then be multiplied by the flow rate of solution to give the iron buildup over time in the electrolyte. The iron concentrations in solution can be measured by testing plant samples with any number of analytical methodologies known in the art, such as atomic absorption spectroscopy (AAS), induced coupled plasma spectroscopy (ICP), X-ray fluorescence, etc.

As used herein, "bleed portion" refers to an amount of electrolyte solution from the copper electrowinning station which is removed from the electrowinning station. In one or more embodiments, the bleed portion is taken directly from the electrowinning station. However, the term is also meant to encompass removal of an amount of electrolyte solution from before or after the electrowinning station, i.e. from the copper-rich electrolyte solution entering the electrowinning station or the copper-lean electrolyte solution exiting the electrowinning station.

As used herein, "bleed stream rate" refers to the rate at which the bleed portion is removed from the electrowinning station. The term encompasses any units which convey a rate of iron per unit of time, including an absolute amount per unit of time (e.g., grams per minute) or concentration per unit of time (e.g. g/L per minute). The term also encompasses dimensionless representations of the bleed portion, such as a ratio of the bleed portion flow rate to the copper-rich electrolyte flow rate. In one or more embodiments, the "bleed stream rate" is sufficient to transfer at least an equivalent amount of iron as is being introduced into the copper electrowinning station.

As used herein, "iron removal" refers to the amount of or rate at which iron is removed by the iron extraction stage. The term encompasses any units which convey a rate of iron per unit of time, including an absolute amount per unit of time (e.g., grams per minute) or concentration per unit of time (e.g. g/L per minute). The term can also encompass an absolute amount (e.g., grams) or concentration (e.g. g/L).

As used herein, "impurity metal" or "impurity" refers to undesired metals present in a metallurgic process. The terms "impurity-rich" or "impurity-loaded" refer to concentrations of impurity metal values relative to "impurity-depleted" or "impurity-stripped," etc. In one or more embodiments, the impurity metal comprises antimony (Sb), tin (Sn) and/or iron (Fe). In some embodiments, it may be desirable to maintain the iron concentration at about 10 times by weight of the manganese present in the solution. In some embodiments, it may be desirable to maintain the iron concentration in the range of from about 0.5, 1.0, or 1.5 to about 2 or 2.5 g/L depending on the site conditions and operator preference. In some embodiments the concentration is maintained from about 1.5 to about 2 g/L. Such a range may be desirable in some applications where any loss in current efficiency due to the presence of iron is offset by the aforementioned benefits of a small amount of iron (Mn control).

In one or more embodiments, the input for the iron extraction circuit is the amount of iron contained in the electrolyte over a unit of time. The amount of iron transferred into the electrolyte over a unit of time can be determined by measuring the difference between the iron in the copper lean electrolyte and the iron in the copper rich electrolyte times the solution flow rate per unit of time. However, the actual iron transfer to the electrolyte can fluctuate over time, so measuring loaded organic iron and iron entrainment in the copper extraction system can work as an early warning system if there may be an upcoming change needed in the iron solvent extraction system.

In the iron extraction stage, the iron rich electrolyte is contacted with a second organic phase (i.e., an organic phase for iron extraction separate from the organic phase for the copper extraction process) containing a reagent as described herein, and the iron is transferred from the copper electrolyte to the organic iron extractant. The copper electrolyte may be sent back to the copper solvent extraction system (e.g., from the electrowinning station) after separation from the organic phase. The iron-loaded organic may then be sent to the iron strip stage where it can be contacted with an aqueous strip solution and the iron is stripped from the iron loaded organic and transferred to the iron-rich strip solution. The stripped iron organic is then sent back to the iron extraction stage and the iron rich strip solution can be sent to the copper heap or dump. While the iron solvent extraction system is operating, the electrolyte is able to maintain its iron concentration at the desired level. It should be noted that in practice, the iron-rich strip solution may in fact contain very little iron. In some embodiments, the exiting strip solution may contain only 1 g/L of iron. In one or more embodiments, the iron concentration does not build substantially in the iron strip solution.

The exact flows may be calculated to determine how much bleed stream is needed to maintain and reduce the iron in the electrolyte. In an exemplary calculation, the net transfer one can achieve in the iron solvent extraction plant is determined by the iron delta of the organic between extraction and stripping in the iron extraction circuit. Where organic iron concentration after loading is $LO_{Fe}$, organic iron concentration after stripping is $SO_{Fe}$, and net transfer is $NT_{Fe}$:

$$LO_{Fe} - SO_{Fe} = NT_{Fe}$$

This must then be multiplied by the organic to aqueous ratio O/A of extraction to determine the concentration of iron removed from the electrolyte (Fe), which is an example of an iron removal value $$NT_{Fe} \times [O/A] = Fe$$

One may also determine how much iron is entering the copper electrowinning stage, i.e. the iron transfer, using one of the methods described above. For example, the iron transfer may be an $Fe_{rate}$ in grams of iron per minute After determining how much iron can be removed from the electrolyte by the iron extraction stage and how much iron is entering the copper electrowinning stage, volume of electrolyte to be treated $V_{treatment}$ may be determined:

$$Fe_{Rate}/Fe = V_{treatment}$$

This $V_{treatment}$ is an example of a bleed stream rate for the bleed stream.

Or the full equation as follows:

$$[Fe_{Rate}/(LO_{Fe} - SO_F)] \times (O/A) = V_{treatment}$$

This provides for the rate at which solution needs to be treated to maintain iron at a constant value in a given system.

This value may be changed by changing any of the variables that contribute to how much iron a particular extractant can remove.

According to one or more embodiments, the extraction agent comprises monoesters of phosphoric acid. The extractant agent may be dissolved in a solvent. In some embodiments, the solvent comprises a water immiscible organic solvent. In further embodiments, the water immiscible organic solvent is selected from the group consisting of kerosene, benzene, toluene, xylene and combinations thereof.

In one or more embodiments, one or more of $R^{1-3}$ of an alkyl ester in the extraction agent is a branched or linear $C_6$-$C_{12}$ alkyl group. In general, it is thought that any monoalkyl or alkyl-substituted aryl group (e.g., iso-octylphenyl) of phosphoric acid may be used provided it contains a sufficient number of carbon atoms to maintain solubility in a hydrocarbon diluent. In further embodiments, one or more of $R^{1-3}$ of an alkyl ester in the extraction agent is a branched or linear $C_6$-$C_9$ group. The one or more alkyl groups may be hexyl, heptyl, octyl, nonyl, decyl, undecyl or dodecyl. One or more of the isomers of these alkyl groups may also be used. In one or more embodiments, the extraction agent comprises iso-octyl (i.e. mixed branched octyl). During preparation of monoalkyl phosphoric acids, there may also be di- or trialkyl phosphate present in the final product.

The concentration of the monoalkyl phosphate ester in the organic may range from about 0.01 or 0.03 M to about 0.5M or 1 M. In one or more embodiments, the extraction agent may be accompanied by an additive, which can help to keep the extraction agent soluble and/or to aid in the stripping reaction (termed a "modifier"). That is, the method may further comprise contacting the electrowinning solution with a modifier. In further embodiments, the modifier and extraction agent are present together in a mixture. Such modifiers may be useful as a solubility and/or thermodynamic modifier. Traditionally, solubility modifiers add polarity to the organic phase so that the complex remains soluble in the organic phase. A thermodynamic modifier will impact the extraction and stripping of the extractant. In some embodiments, the modifier may have qualities as both a thermodynamic and solubility modifier. In some embodiments, modifiers are present in about 0.5, 1.0 or 1.5 to about 30, 45, or 60 moles of modifier per moles of mono alkyl phosphoric acid.

In some embodiments, the additive comprises a long chain alcohol. In one or more embodiments, $C_8$-$C_{16}$ linear, branched or cyclic or aryl alcohol. In further embodiments, the modifier comprises a $C_{10}$-$C_{13}$ linear, branched or cyclic or aryl alcohol. In yet further embodiments, wherein the modifier comprises isotridecanol (also known as tridecanol or TDA) or isodecanol. In one or more embodiments, the organic comprises an additive and additional phosphate esters, including di- or trialkyl phosphate esters. Examples of suitable trialkyl phosphate esters include, but are not limited to, tributyl phosphate, trihexyl phosphate ester, trioctyl phosphate ester, and tripentyl phosphate ester.

The feedstock/electrolyte solution containing dissolved impurity metal values is contacted with the water-immiscible organic solution comprised of a hydrocarbon solvent as described herein and one or more extractant agents described herein for a period of time sufficient to allow the extractant agents to form a complex with the metal impurity ions. The feedstock can be contacted by the organic solution in any manner that brings the two immiscible phases together for a period of time sufficient to allow the extraction agents to form a complex with the impurity metal ions. This includes shaking the two phases together in a separatory funnel or mixing the two phases together in a mix tank as described in U.S. Pat. No. 4,957,714, the entire contents of which are incorporated herein by reference. In some embodiments, a Bateman Pulsed column may be used to contact the two phases together.

In any of the above-mentioned processes, the aqueous solution may be withdrawn from an electrowinning circuit. That is, the aqueous solution may comprise an electrolyte solution taken from an electrowinning apparatus. Alternatively, aqueous solution may be taken from electrolyte lines leading either into or out of the electrowinning apparatus. In some embodiments, aqueous electrolyte solution may be continuously taken from the electrowinning circuit. For example, a bleed line may be taken from either the input, output or the electrowinning apparatus itself.

Where the electrowinning is part of a copper recovery process, copper may be present in amounts of about 10, 20 or 25 to about 50 or 60 g/L. In some embodiments, the electrolyte may also contain anywhere from about 100 g/L to 230 g/L of sulfuric acid. In further embodiments, the electrolyte may contain about 140 g/L to about 180 g/L.

In embodiments where the extraction agent is contacted or mixed (e.g., in a solvent extraction step) with the aqueous solution, the method may further comprise separating the impurity-depleted aqueous solution from the iron-loaded organic solution. This can be done by any methods known in the art, for example, by using a settling tank or other settler.

In some embodiments, the impurity-depleted aqueous solution can then be returned to the electrowinning circuit. As the impurity metals such as iron have been reduced, the electrolyte solution may undergo electrowinning with increased current efficiency. The impurity-depleted aqueous solution may also be returned to the metal recovery circuit generally (i.e., returned as lean electrolyte to a stripping stage). In further embodiments, the impurity-depleted aqueous solution is continuously returned to the electrowinning circuit. For example, there may be a continuous feed from the solvent extraction stage back into the electrowinning circuit and/or apparatus. This is possible because there is a completed loop recycling the various solutions.

In one or more embodiments, the method further comprises subjecting the impurity-loaded organic solution to a second solvent extraction stage comprising mixing the impurity-loaded organic solution with an aqueous phase comprising an acid, such that at least a portion of the impurity metal values are transferred into the aqueous acid, and an impurity-rich raffinate and impurity-stripped organic solution are provided. In one or more embodiments, the acid comprises sulfuric acid ($H_2SO_4$). In some embodiments, there may be two or three extraction stages and/or stripping stages. In further embodiments, the method may further comprise repeating the first solvent extraction stage and using the impurity-stripped organic solution as the organic solution. That is, the impurity-stripped organic solution may be recycled and used to extract more impurity metal from fresh impurity-rich electrolyte solution. The impurity-rich raffinate can then be used to leach copper from ore, and can therefore be recycled into the larger metal recovery plant circuit. For example, the input of acid could comprise a feed system of 400 g/L sulfuric acid. The impurity-rich sulfuric acid stream could then be sent to leach copper. In further embodiments, this impurity-rich sulfuric acid stream could be diluted with raffinate from the copper extraction before being sent to leaching. It could be used as a portion of the makeup acid required in such leaching processes. In some embodiments, one, two or three stages of impurity metal extraction, and/or one, two or three stages of impurity metal stripping may be incorporated into the method/system.

In one or more embodiments, the ferric concentration in the electrolyte is measured and/or metered. Information based on these readings can be used to control the electrolyte flow. In some embodiments, the ferric concentration is metered and when it reaches a certain level, electrolyte solution stops being treated. In one or more embodiments, as the ferric concentration goes above a certain level, electrolyte solution is treated. The particularly desired level will be determined by the particular needs of a given plant.

In some embodiments, the method and/or systems may further comprise one or more repurposing wash stages comprising washing with a diluent such as kerosene. That is, in some embodiments, it may be possible to convert a wash stage that was formerly used to wash iron off the copper loaded organic phase and use it to wash the iron depleted copper electrolyte before it is returned to the process to remove any entrained iron extraction organic phase so that the iron extractant is not transferred to the copper extraction circuit.

The number of washing stages that would otherwise be needed may be reduced in view of the impurity metal extraction process/plant described herein. Wash stages that are usually used for iron reduction may be converted to extraction/stripping stages to increase production. This can help to significantly increase copper production at minimum capital cost. Currently, plants use two approaches to control the level of iron in the tank house. Firstly, the electrolyte may be bled, and fresh acid and water added to the tank house to maintain the electrolyte volume. Secondly, the loaded organic may be washed before stripping with a dilute acid solution containing a bit of copper in a separate mixer-settler (wash stage). The use of clean water and acid in this stage results in dilution of the entrained aqueous in the loaded organic resulting in less transfer of iron to the tank house by entrainment. The additional copper helps to crowd some of the chemically loaded iron off the organic. If there is an alternative method of iron control, they can use this wash stage for another purpose. The wash stage may be used as an additional extraction stage to treat additional pregnant leach solution and recover more copper. They can also use it as an additional stripping stage. This allows them to more efficiently strip the loaded organic transferring more copper to the electrolyte and also resulting in a stripped organic that has more capacity of copper extraction. Wash stages represent a significant capital expense which has limited return. Use as an extraction or strip stage has potential for greater return if the iron is controlled in a different fashion.

The increase in current efficiency as a result of the methods described herein allows for more copper plated without additional current.

System

Another aspect of the invention pertains to systems useful for controlling impurity metals during metallurgic processes. The system comprises:
  a. a mixer comprising
    i. a first input connected to a source of an aqueous impurity-rich electrolyte solution;
    ii. a second input connected to a source of an organic impurity-lean solution comprising an extraction agent comprising a monoalkyl phosphate ester having a structure represented by

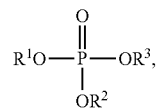

wherein $R^1$ comprises a linear, branched or cyclic alkyl or aryl group, and $R^2$ and $R^3$ each independently comprise H; and
  b. a separator in fluid communication with the mixer, the separator comprising
    i. a first output for an aqueous impurity-lean electrolyte solution to exit the separator;
    ii. a second output for an organic impurity-loaded solution to exit the separator.

In some embodiments, the separator comprises a settler or settling tank. In some embodiments, the extraction agent may further comprise a dialkyl phosphate ester. In some embodiments, the monoalkyl and dialkyl phosphate esters are present in a molar ratio of about 20:1 to about 0.1:1, about 10:1 to about 0.2:1, or about 5:1 to about 0.2:1.

Any of the above variants in the method may be applied to the system, including variants in the extraction reagent, inclusion of modifiers, etc. For example, some methods feature a second extraction stage for stripping metal impurities from the metal impurity-loaded organic. Accordingly, in such embodiments, the system may further comprise:
  a. a second mixer comprising
    i. a first input connected to the output for the organic impurity-loaded solution in the first separator;
    ii. a second input connected to an acid source; and
  b. a second separator in fluid communication with the second mixer, the second separator comprising
    i. a first output for an organic impurity-stripped solution to exit the separator;
    ii. a second output for an impurity-rich raffinate solution to exit the separator.

In some embodiments, the acid source is an aqueous sulfuric acid source. In one or more embodiments, concentrated sulfuric acid is metered as it flows into an aqueous stream just prior to its introduction into the stripping process. In some embodiments, acid may simply be added to copper solvent extraction raffinate and then used to strip the organic.

In one or more embodiments, the system may further comprise an electrowinning station/apparatus comprising: (a) a first input connected to the second output of the first separator; and (b) a first output connected to the first input of the first mixer. The aqueous solution may be taken from a copper electrowinning electrolyte solution. In such embodiments, the aqueous impurity-rich electrolyte solution also comprises copper in any of the concentrations described above. In some embodiments, inputs and outputs as described above are connected such that they continuously provide either the aqueous or organic solution to be treated. For example, in one or more embodiments, the first input of the first mixer and the first output of the electrowinning station comprise a continuous feed stream. In some embodiments, the input of the electrowinning station and the second output of the first separator comprise a continuous feed stream.

Figure 2:
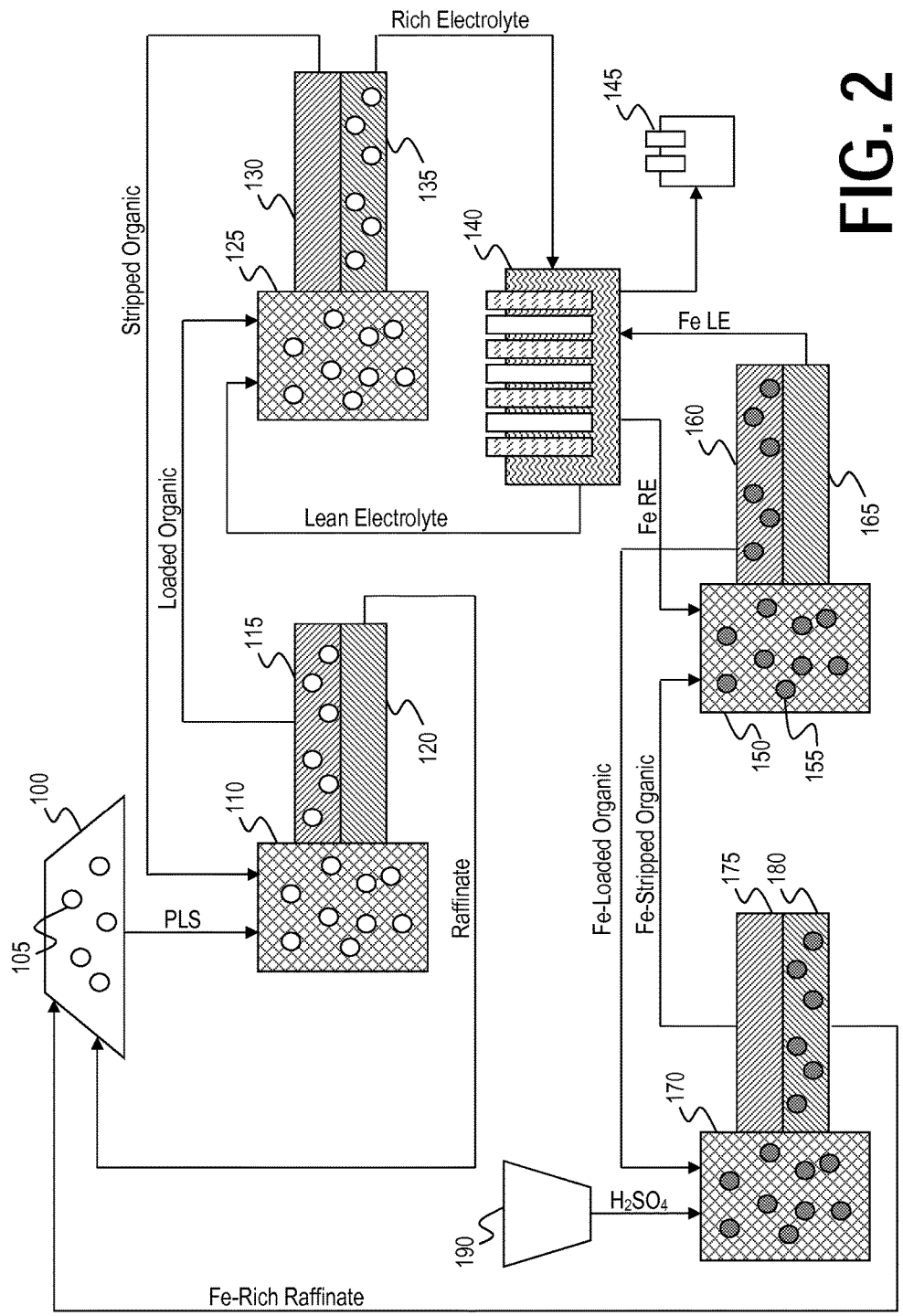
FIG. 2 shows a leach-solvent extraction plant according to one or more embodiments of the invention.

FIG. 2 illustrates a plant schematic of a system and/or method according to one or more embodiments of the invention. The schematic of the figure shows what would be the simplest configuration, having one extraction/separation stage. A heap or dump of copper ore 100 containing copper metal values 105 is exposed to an aqueous leach solution, which could comprise (i.e., sulfuric acid) thereby extracting at least a portion of the copper metal values into the leach solution. This copper-bearing solution is known as a "pregnant leach solution," or "PLS." The PLS then undergoes a solvent extraction step. The PLS is moved to a first mixer 110, which mixes the aqueous pregnant leach solution with an organic phase comprising a copper extraction agent (i.e., BASF LIX® extractants). During the mixing step, the metal values 105 are extracted into the organic phase during this process to yield a "loaded organic." The aqueous phase, from which the copper values have been substantially removed 105 is termed a "raffinate." Generally, between about 75 to 95% of the copper is removed from the feed solution. The aqueous and organic phases may then be passed to a settler, which separates the mixture into the loaded organic 115 and raffinate 120. The raffinate is recycled back to the copper ore 100 to be re-used in another leaching step. The loaded organic is then moved to a second stripping stage. The loaded organic is mixed with an aqueous phase in mixer 125. During this time, metal values 105 are stripped into the aqueous phase to provide a "rich electrolyte" solution. The organic phase, from which the metal values have been substantially removed, is termed the "stripped organic." Generally, the stripped organic phase will contain about 0.3 g/L to about 4 g/L, depending on the reagent, reagent concentration and the stripping conditions. The mixture is sent to a settler, which separates the mixture into the stripped organic 130 and the rich electrolyte 125. The stripped organic can then be recycled back to the mixer in the first solvent extraction stage for use in extracting copper metal values into the organic phase from the pregnant leaching solution. The rich electrolyte solution may then be moved to an electrowinning station 140. In the electrowinning station 140, copper metal is recovered by plating it as metal at a cathode 145.

It is during this process that iron may build up in concentration in the electrowinning station 140. Thus, a bleed stream may be taken for treatment according to one or more embodiments of the invention. In the figure, it is shown as taken from the electrowinning station 140. However, it should be noted that the stream could be taken from the rich and/or lean electrolyte lines as well. This stream, termed the "iron-rich electrolyte" or "Fe-RE" is taken from the electrowinning station 140 and sent to a mixer 150 comprising the iron-rich electrolyte with iron values 155 and an organic phase comprising one or more of the extraction agents described herein. During mixing, at least a portion of the iron values move into the organic phase to provide an "iron-loaded organic" or "Fe-loaded organic" solution. The electrolyte solution now contains less iron, and is termed the "iron-lean electrolyte" or "Fe LE." The mixed organic and aqueous phase may then go to a settler, where the iron-loaded organic phase 160 containing the iron values is separated from the iron-lean electrolyte 165. The iron-lean electrolyte can be returned to the electrowinning station, thereby providing a reduced iron concentration. The iron values can then be stripped from the organic phase. The iron-loaded organic is moved to another mixer 170, where it is mixed with an acid, for example sulfuric acid, from an acid source 190. In some embodiments, the acid source is an aqueous sulfuric acid source. In one or more embodiments, concentrated sulfuric acid is metered as it flows into an aqueous stream just prior to its introduction into the stripping process. In some embodiments, acid may simply be added to copper solvent extraction raffinate and then used to strip the organic. During mixing, the iron values 155 in the iron-loaded are moved into the aqueous phase providing an "iron-stripped organic" or "Fe-stripped organic" and "iron-rich raffinate" or "Fe-rich raffinate." In extraction, the extractant (i.e., isooctyl alkyl phosphoric acid) gives up a proton and the resultant organic anion associates with the ferric cation to form a complex. In stripping, the high sulfuric acid concentration results in reprotonation of the IOAP anion and the ferric ion transfers back into the aqueous. After mixing, the mixture can be passed into a settler, where the iron-stripped organic 175 is separate from the iron-rich raffinate 180. The iron-stripped organic 175 can then be returned to mixer 150 to be used to extract more iron values from fresh iron-rich electrolyte. The iron-rich raffinate 180 can then be used as a fresh acid source to leach copper ore 100. Ferric ions brought to leach will not interfere with additional copper solvent extraction. The above embodiments show a simple loop where there are no waste streams that need to be treated.

As seen from the above, only one extraction and strip stage are needed to generate net transfer. Overall the efficiency of the extraction and strip is not important as only a net transfer of ferric is required to keep ferric levels in an acceptable range in the electrolyte. However, additional stages may be added as the situation calls for.

There are several advantages of one or more of the processes and/or systems described herein over other methods of iron reduction. One such advantage is that one or more embodiments of the invention provide for a continuous process. Known processes that use resins cannot be carried out continuously, as the resins need to be regenerated after certain periods of use.

One or more embodiments of the invention also provide advantages over traditional bleeding methods wherein electrolyte solution is removed and discarded. As discussed in the Background section, electrolyte may be bled from the system. However, along with iron, other components are unintentionally lost through the bleeding. One such component is cobalt, which is added to protect lead anodes. The extraction agents described herein are targeted to iron, such that iron is selectively removed but leaving the cobalt concentration intact. In contrast, the methods and systems described herein allow for only particular components to be removed, thereby preventing costs associated with the loss of desired components.

However, in some embodiments, the methods described herein may still be accompanied by a bleed process. Such a need may arise due to entrainment. In such embodiments, there will still be a great deal of savings, as the amount of bleeding will be greatly diminished by running the process.

Yet another advantage is that alternate anodes in the electrowinning station could be exchanged for regular anodes. Alternate anodes have been used because they obtain better current efficiency. Because the current density is preserved as a result of the methods and systems described herein, conventional anodes may instead be used. The cost of alternate anodes can be nine times higher than conventional anodes. As a result, use of the methods/systems described herein would allow for cost saving in the equipment used.

Another benefit is not having to reprocess copper, which can be an issue if a solvent extraction plant is at the limit of copper transfer. When an electrolyte is bled to control iron, the bleed stream is typically mixed with incoming pregnant leach solution so that there is a chance to potentially recover some of the copper contained in the bleed and return it to the tank house. What is not extracted returns to leaching and eventually returns to extraction for recovery. This is in effect a double handling of the copper. If the tank house has the capacity to plate the copper but there is limited capacity to transfer copper to the tank house due to solvent extraction constraints, this can be problematic. Usually, though, this is not an issue because the copper is double handled, resulting in additional cost. This will reduce energy use, and is better for the environment. This advantage also allows for quicker recovery of the copper, without having to wait for it to be recycled.

EXAMPLES

Example 1—Preparation of the Extraction Agent Compositions

Initial testing used 42 g/L isooctyl acid phosphate (Available from IsleChem, 32% w/w monoisooctyl and 67% w/w di-isooctyl) with isotridecanol (TDA) modifier in ShellSol D70. The feed solution was a synthetic electrolyte (35 g/L Cu and 160 g/L sulfuric acid in deionized water) spiked with 2 g/L Fe as ferric sulfate. The organic and aqueous feed solutions were contacted at an organic:aqueous (O:A) of 1:1 by volume in a 200 ml jacketed baffled beaker at 1750 RPM at 40° C. for at least 10 min. The resultant solutions were filtered through PS1 paper in the case of the organic phase and through Whatman #42 filter paper in the case of the aqueous to remove any entrainment and then saved for analysis. To test stripping an aliquot of the organic was contacted with a strip solution at an O:A 1:1 by volume by shaking in a separatory funnel on an automatic shaker at room temperature for 30 min. The resultant solutions were saved for analysis and filtered through appropriate filter paper to remove entrainment. Varying solutions were used to strip the loaded organic.

TABLE 1

Summary of Strip Solutions

Feed is synthetic electrolyte containing 2 g/L of ferric ion

| Reagent | Loaded Organic [Fe] (g/L) | Raffinate [Fe] (g/L) | Strip solution | Stripped organic [Fe] (g/L) | Strip aqueous [Fe] (g/L) |
|---|---|---|---|---|---|
| 42 g/L Isooctyl acid phosphate | 2.235 | 0.005 | 400 g/L H$_2$SO$_4$ 10% (w/v) Ammonia | 2.2 0 | 0.085 0 |
| | | | 400 g/L MSA 10% (w/v) Ammonia 10% (w/v)Ammonium Chloride | 2.247 0 | 0 0 |
| | | | 5% (w/v) NaOH | 0 | 0 |
| | | | 5% (w/v) NaHCO$_3$ | 0 | 0 |
| 42 g/L Isooctyl acid phosphate 5% (v/v) TDA[1] | 2.186 | 0.032 | 400 g/L H$_2$SO$_4$ 10% (w/v) Ammonia | 1.907 2.064 | 0.258 0 |
| | | | 400 g/L MSA 10% (w/v) Ammonia 10% (w/v) Ammonium Chloride | 2.183 2.178 | 0.038 0 |
| | | | 5% (w/v) NaOH | 0.024 | 0 |
| | | | 5% (w/v) NaHCO$_3$ | 0.204 | 0 |
| 42 g/L Isooctyl acid phosphate 10% (v/v) TDA[2] | 2.11 | 0.098 | 400 g/L H$_2$SO$_4$ 10% (w/v) Ammonia | 1.538 2.034 | 0.475 0 |
| | | | 400 g/L MSA 10% (w/v) Ammonia 10% (w/v) Ammonium | 1.987 2.075 | 0.092 0 |

TABLE 1-continued

Summary of Strip Solutions

Feed is synthetic electrolyte containing 2 g/L of ferric ion

| Reagent | Loaded Organic [Fe] (g/L) | Raffinate [Fe] (g/L) | Strip solution | Stripped organic [Fe] (g/L) | Strip aqueous [Fe] (g/L) |
|---|---|---|---|---|---|
| | | | Chloride 5% (w/v) NaOH | 0.008 | 0.014 |
| | | | 5% (w/v) NaHCO$_3$ | 0.948 | 0 |

[1]TDA/mono isooctyl phosphoric acid molar ratio = 3.29.
[2]TDA/mono isooctyl phosphoric acid molar ratio = 6.59

Example 2—Amount of Modifier

Figure 3:
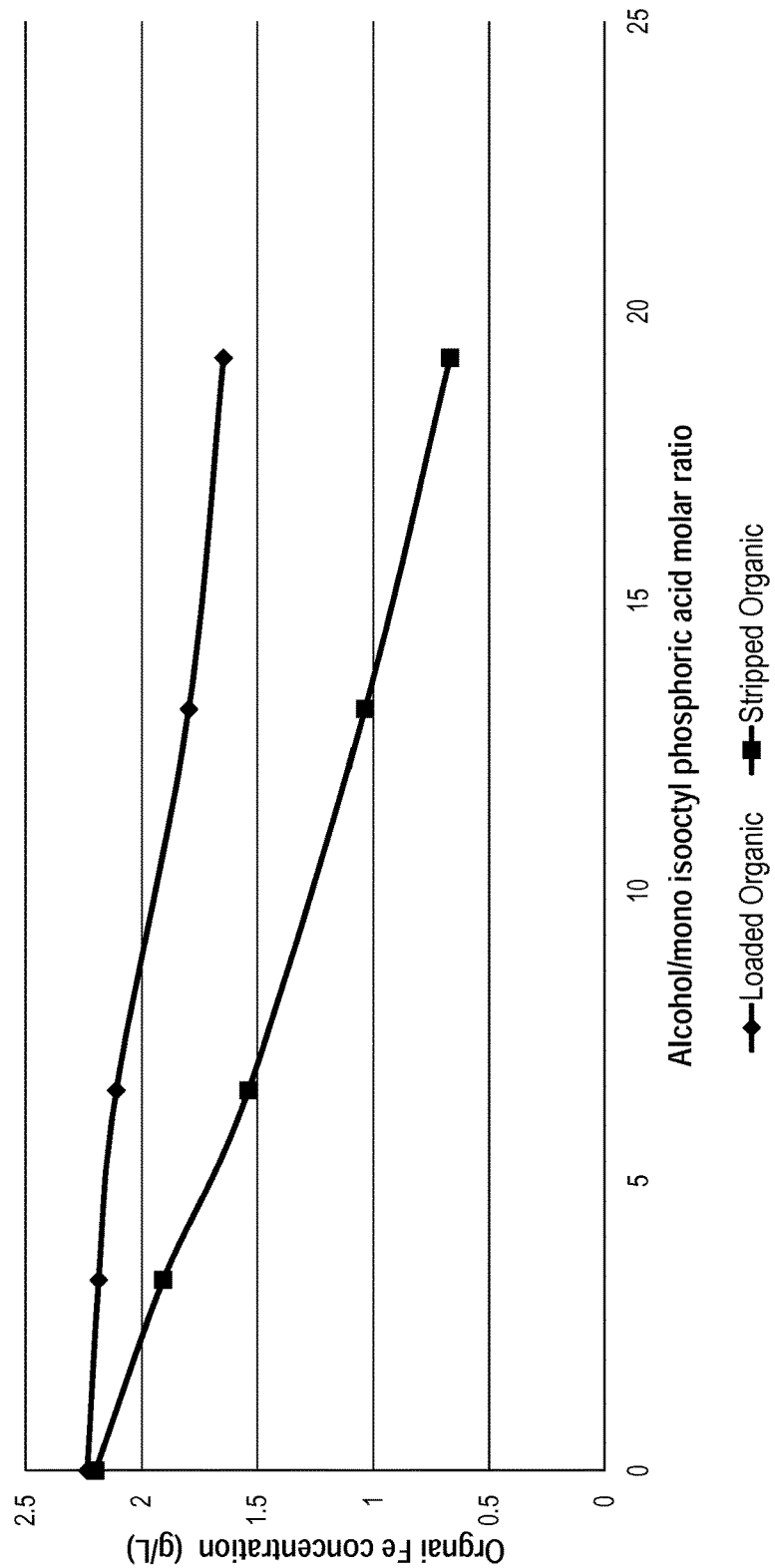
FIG. 3 is a graph showing the effects of increasing the molar ratio of a modifier relative to an extractant according to one or more embodiments of the invention.

It was found that the increase in TDA yielded higher net transfer so more modifiers were tested and higher concentrations of TDA were tested. These organics were made up and tested using the same testing procedure as used in Example 1; however, the strip solution for all the work was 400 g/L sulfuric acid. 2,2,4-trimethyl-1,3-pentanediol di-isobutyrate (TXIB), di-n-butyl adipate (DBA) and tri-n-butyl phosphate (TBP) were also tested. The results are shown in Table 2 below. As can be seen in Table 2, the TDA had the best performance. FIG. 3 shows the effects of increasing the molar ratio of modifier (isotridecyl alcohol) in this case relative to the mono isooctyl phosphoric acid on both extraction and stripping. Increasing the modifier content depresses stripping more than extraction resulting in an increase in net transfer. This implies a synergistic effect. A certain level of modifier is required in any case to maintain the IOAP iron complex in solution in the organic phase and avoid the formation of a third phase.

TABLE 2

Modifier Testing

| Modifier | Modifier/ mono isooctyl phosphoric acid Molar Ratio | Loaded Org (LO) [Fe] (g/L) | Stripped Org (SO) [Fe] (g/L) | Fe Net Transfer (g/L) |
|---|---|---|---|---|
| None | 0 | 2.235 | 2.2 | 0.085 |
| TDA | 3.28 | 2.186 | 1.907 | 0.258 |
| TDA | 6.56 | 2.11 | 1.538 | 0.475 |
| TDA | 13.13 | 1.795 | 1.036 | 0.748 |
| TDA | 19.19 | 1.646 | 0.669 | 0.83 |
| TXIB | 5.46 | 2.415 | 2.087 | 0.112 |
| DBA | 6.05 | 2.151 | 2.008 | 0.141 |
| TBP | 1.50 | 1.743 | 1.093 | 0.368 |

Example 3

To determine the extraction and stripping characteristics of the reagent, both extraction and stripping isotherms were conducted. To show the suppression of extraction due to higher acid electrolyte the McCabe-Thiele extraction isotherm was determined using the synthetic electrolyte from Example 1 as aqueous feed solution in one case and in the other as feed solution after spiking the acid concentration to 200 g/L sulfuric acid conducted with 2 g/L Fe spiked synthetic electrolyte and a 2 g/L Fe spiked synthetic electrolyte also spiked to 200 g/L acid with concentrated sulfuric acid. The corresponding McCabe-Thiele strip isotherm was determined using 400 g/L sulfuric acid as the aqueous strip solution and maximum loaded organic (42 g/L isooctyl acid phosphate with 30% (v/v) TDA in ShellSol D70).

TABLE 3

160 g/L acid extraction isotherm
160 gpl Acid Extraction (g/L Fe)

| O | : | A | Aqueous [Fe] (g/L) | Organic [Fe] (g/L) |
|---|---|---|---|---|
| 4 | : | 1 | 0.068 | 0.507 |
| 2 | : | 1 | 0.189 | 0.9535 |
| 1 | : | 1 | 0.474 | 1.622 |
| 1 | : | 2 | 0.977 | 2.238 |
| 1 | : | 4 | 1.408 | 2.752 |
| 1 | : | 8 | 1.676 | 3.36 |
| 1 | : | 10 | 1.717 | 3.79 |
| 1 | : | 15 | 1.849 | 3.705 |
| PLS | : | | 2.096 | |

TABLE 4

200 g/L acid extraction isotherm
200 gpl Acid Extraction (g/L Fe)

| O | : | A | Aqueous [Fe] (g/L) | Organic [Fe] (g/L) |
|---|---|---|---|---|
| 4 | : | 1 | 0.204 | 0.4645 |
| 2 | : | 1 | 0.379 | 0.8415 |
| 1 | : | 1 | 0.705 | 1.357 |
| 1 | : | 2 | 1.155 | 1.814 |
| 1 | : | 4 | 1.488 | 2.296 |
| 1 | : | 8 | 1.758 | 2.432 |
| 1 | : | 10 | 1.788 | 2.74 |
| 1 | : | 15 | 1.865 | 2.955 |
| PLS | : | | 2.062 | |

TABLE 5

400 g/L acid strip isotherm
400 g/L Acid Strip

| O | : | A | Aqueous [Fe] (g/L) | Organic [Fe] (g/L) |
|---|---|---|---|---|
| 50 | : | 1 | 12.07 | 2.436 |
| 25 | : | 1 | 7.13 | 2.295 |
| 10 | : | 1 | 5.58 | 2.079 |
| 5 | : | 1 | 4.219 | 1.772 |
| 2.5 | : | 1 | 2.626 | 1.561 |
| 1 | : | 1 | 1.365 | 1.203 |
| 1 | : | 2 | 0.834 | 0.838 |
| L.O. | : | | | 2.645 |

Figure 4:
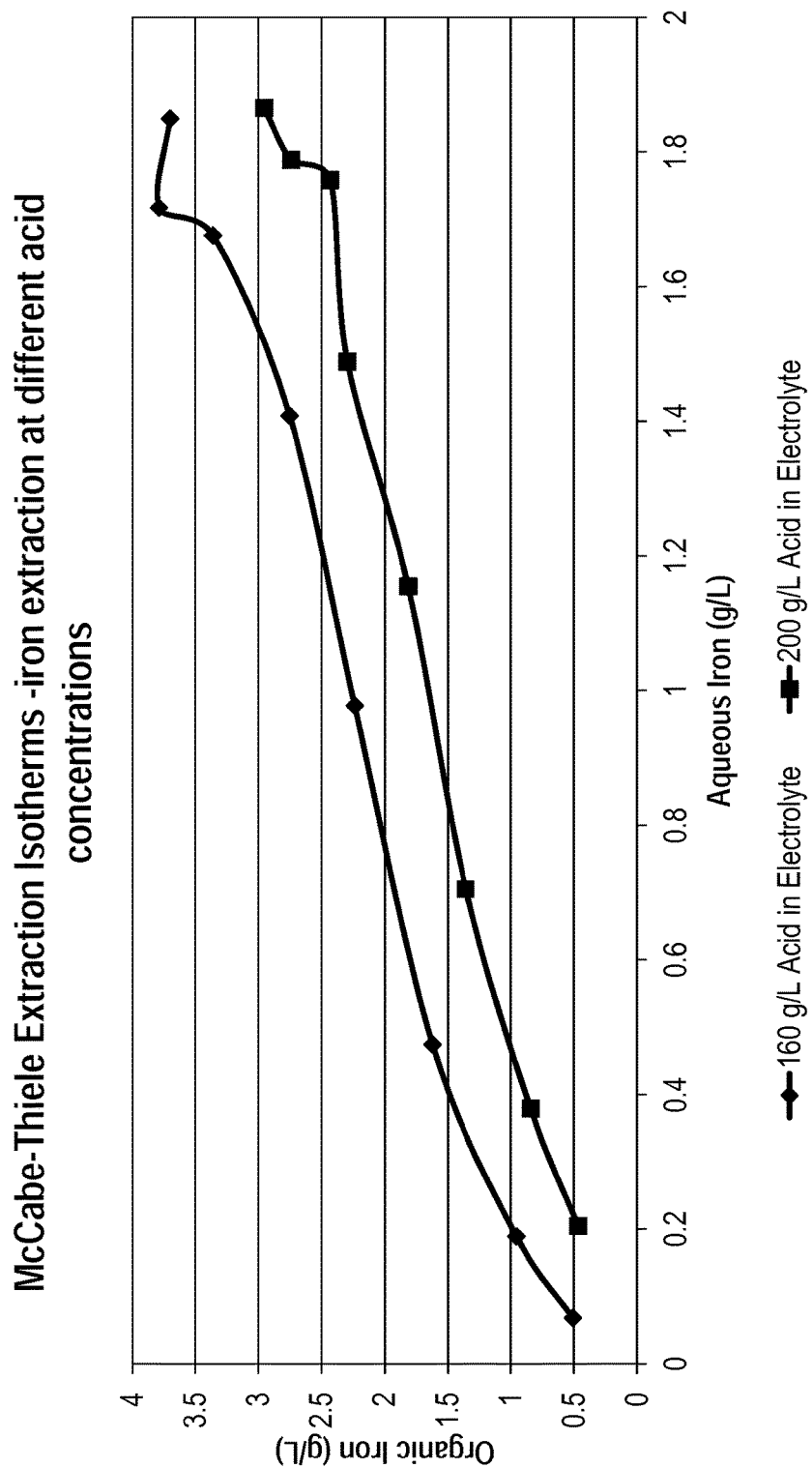
FIG. 4 is a McCabe-Thiele Extraction Isotherm for iron extraction at different acid concentrations in accordance with one or more embodiments of the invention.

FIG. 4 is a graph showing an iron extraction isotherm from a synthetic electrolyte containing 2 g/L ferric ion with an acid concentration of either 160 g/L acid or 200 g/L acid. As can be seen from the graph, iron is extracted well from the aqueous solution.

Figure 5:
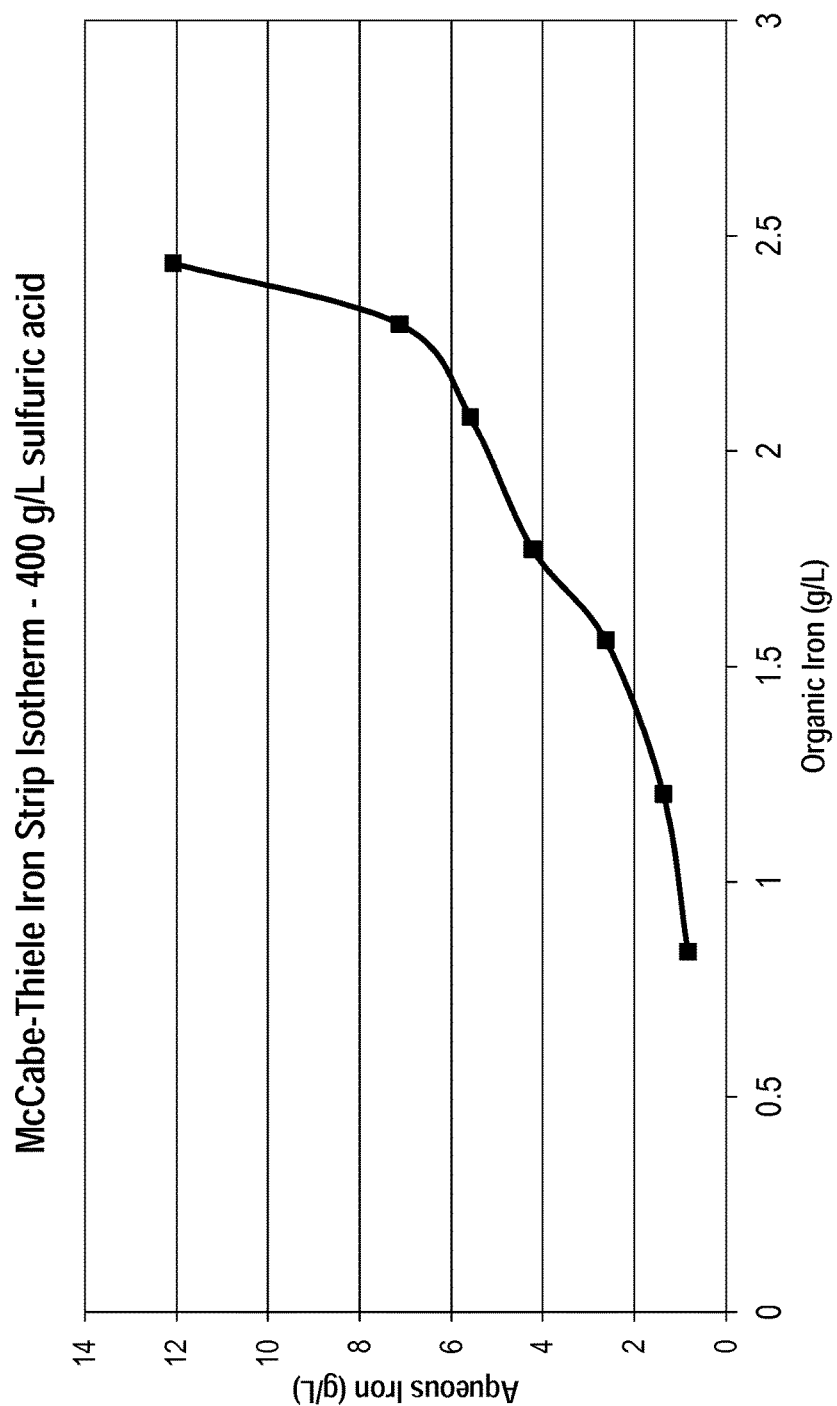
FIG. 5 is a McCabe-Thiele Iron strip isotherm for a stripping process in accordance with one or more embodiments of the invention.

FIG. 5 is a graph showing an iron stripping isotherm from a loaded organic containing 2.65 g/L ferric ion. As can be seen from the graph, iron is stripped well from the organic solution.

Example 4—Solubility of Extraction Agent

To determine the optimum extractant reagent concentration, varying concentrations of isooctyl acid phosphate were made up in 30% (v/v) TDA and ShellSol D70 and these were put in the auto shaker and contacted multiple times with fresh 2 g/L ferric iron spiked synthetic electrolyte. The solutions were visually observed for third phase formation. It was found that the 25.2 g/L isooctyl acid phosphate was clear with no solubility issues however when the concentration increased to 33.6 g/L there was slight cloudiness and a small amount of third phase. This indicated that under these conditions 25.3 g/L or less would be the optimal formulation.

Example 5—Modifier Optimization

Modifier amount was optimized again at an extractant concentration of 21 g/L. Four solutions containing 21 g/L isooctyl acid phosphate (IOAP) and 10, 20, 30 or 40% v/w TDA where made up in ShellSol D70. These were put through the extract and strip cycle in Example 2 and the samples analyzed to determine the net transfer of these new formulations. There was slight third phase formation for the 10% v/v TDA sample, but very minor which did not impact phase disengagement times.

TABLE 6

Impact of increasing TDA concentration on net transfer

| TDA/mono isooctyl phosphoric acid Molar Ratio | Loaded Org (LO) [Fe] (g/L) | Stripped Org (SO) [Fe] (g/L) | Net Transfer (g/L) |
|---|---|---|---|
| 13.12 | 1.313 | 0.744 | 0.569 |
| 26.25 | 0.765 | 0.249 | 0.516 |
| 39.37 | 0.556 | 0.141 | 0.415 |
| 52.5 | 0.425 | 0.092 | 0.333 |

Figure 6:
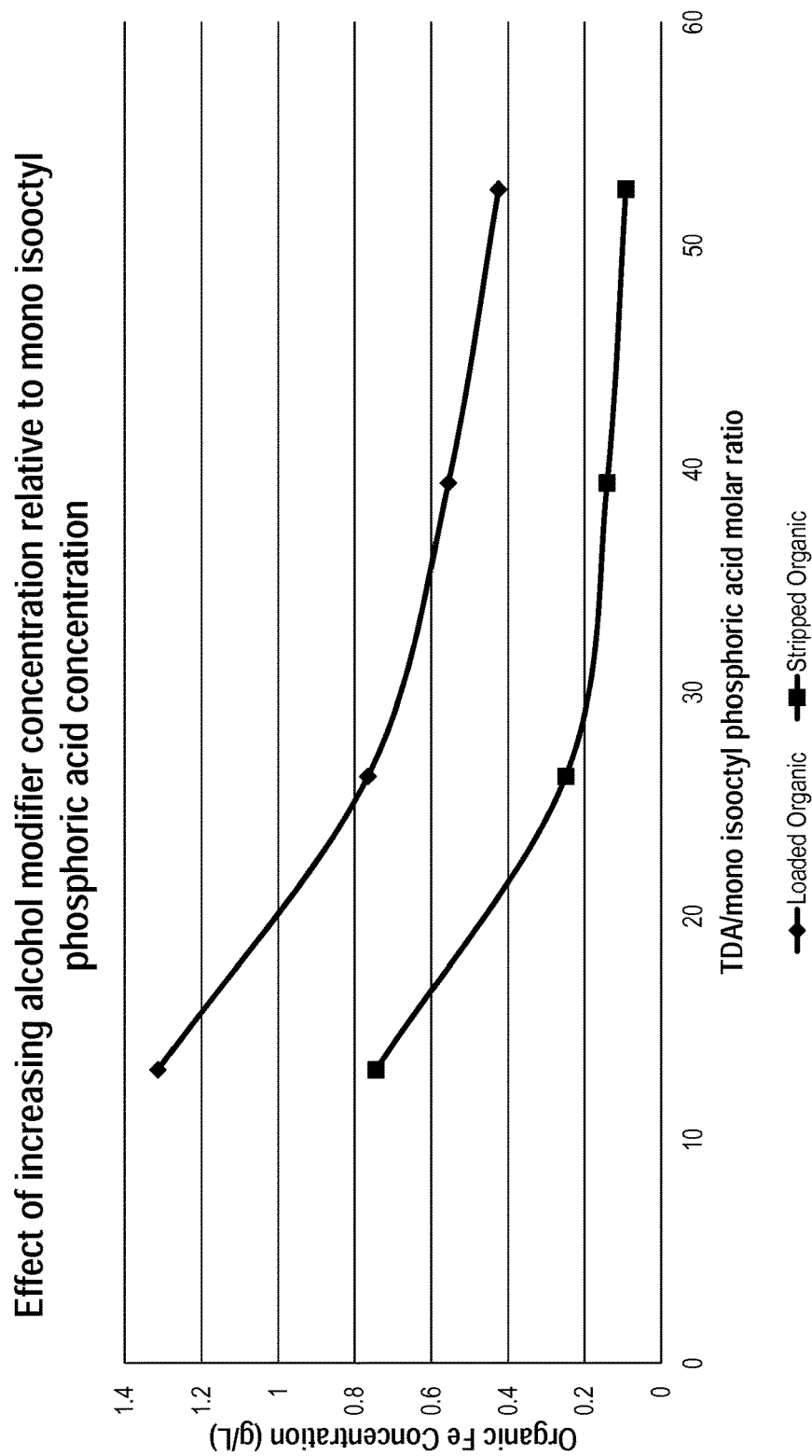
FIG. 6 is a graph showing the effect of increasing alcohol modifier concentration relative to an extractant in accordance with one or more embodiments of the invention.

FIG. 6 is a graph summarizing the impact of increasing modifier concentration on loading and stripping of the organic phase. As seen from FIG. 5 and FIG. 6, 21 g/L reagent with 1 to 8 times by weight of TDA (TDA/mono isooctyl phosphoric acid molar ratio=2.5 to 26.25) can be considered an optimal formulation.

Example 6—Laboratory Circuit

To test this reagent a laboratory circuit was set up with three stages with two mix boxes per stage. The circuit configuration was two extract and one strip. It was run at ambient temperature. Primary mixers impellers were standard pump mixers 1.25 in diameter at 1750 rpm, secondary mixers impellers were Rushton turbine impellors 1.25 in diameter at 800-1200 rpm to maintain proper flow. The circuit was run using 21 g/L isooctyl acid phosphate and 20% (w/v) TDA. The strip solution was 400 g/L sulfuric acid. The feed solution was 38 g/L Cu, 200 g/L acid and 3 g/L Fe. O:A flow ratio was held at about 1:1 with slight fluctuations in flow. Mixer retention time through both mixers was 6 min for each stage. All mixers where run aqueous continuous.

The results are summarized in Tables 8 and 9 below. Under the conditions of the circuit test, approximately 24% of the incoming iron in the feed solution was extracted with no extraction of cobalt.

Example 7—Reagent Selectivity

The next test utilized the iron spiked synthetic electrolyte with an additional metal selected from Sb and Sn. These solutions therefore contained copper, iron and one other metal in 160 g/L sulfuric acid. Extraction and stripping conditions were the same as Example 2. It can be seen that antimony and tin may also be extracted from the electrolyte.

TABLE 7

Extraction of Metals from Copper Electrolyte

| Metal | Extract g/L | Strip g/L | Feed g/L |
|---|---|---|---|
| Fe | 1.384 | 0.840 | 1.866 |
| Sb | 0.184 | 0.152 | 0.241 |
| Sn | 0.085 | 0.057 | 0.226 |

TABLE 8

Circuit Parameters

| Reagent | Date | Time | Flows ml/min | | | Continuity | | | % Rec | O/A (flow) | (min) Retention Time | Fe Electrolyte Delta |
|---|---|---|---|---|---|---|---|---|---|---|---|---|
| | | | Feed | Strip | Org | E1 | E2 | S | | | | |
| 21 g/L Isooctyl Acid Phosphate w/ 20%(v/v)TDA in ShellSol D70 | Feb. 21, 2013 | 13:30 | 41 | 40.5 | 42 | Aq | Aq | Aq | 28.30% | 1.02 | 6.02 | 0.865 |
| | Feb. 21, 2013 | 14:30 | 42 | 42 | 41.5 | Aq | Aq | Aq | 23.86% | 0.99 | 5.99 | 0.72 |
| | Feb. 21, 2013 | 15:30 | 41.5 | 41.5 | 41.5 | Aq | Aq | Aq | 22.76% | 1.00 | 6.02 | 0.704 |

TABLE 9

Circuit Results

| Reagent | Date | Time | Fe/Co | | | | | | | | |
|---|---|---|---|---|---|---|---|---|---|---|---|
| | | | E1 Aq | E1 Org | E2 Aq | E2 Org | S Aq | S Org | Feed | Strip | |
| 21 g/L Isooctyl Acid Phosphate w/ 20%(v/v)TDA in ShellSol D70 | Feb. 21, 2013 | 13:30 | 2.825 0.187 | 0.852 | 2.191 0.18 | 0.716 | 0.485 0 | 0.207 0.183 | 3.056 | 0 | |
| | Feb. 21, 2013 | 14:30 | 2.871 0.17 | 0.914 | 2.297 0.171 | 0.734 | 0.66 0 | 0.187 0.172 | 3.017 | 0 | |
| | Feb. 21, 2013 | 15:30 | 2.9 0.176 | 0.883 | 2.389 0.168 | 0.755 | 0.682 0 | 0.266 0.172 | 3.093 | 0 | |

Example 8—Impact of Sulfuric Acid on Stripping

Using a loaded organic (21 g/L isooctyl acid phosphate; 20% (v/v) TDA in Shellsol D70; 1.2 g/L Fe), 50 ml samples of the organic were contacted at an O/A of 1:1 on a volume basis for 5 min with varying concentrations of sulfuric acid. The resultant organic and aqueous samples were analyzed for iron to determine the impact of sulfuric acid concentration on stripping.

TABLE 11

Impact of Sulfuric Acid Concentration on Stripping

| g/L $H_2SO_4$ | Aq Fe (g/L) | Org Fe (g/L) | Org Fe Delta (g/L) | Mass Balance |
|---|---|---|---|---|
| 150 | 0.194 | 0.98 | 0.244 | 95.9% |
| 200 | 0.319 | 0.811 | 0.413 | 92.3% |
| 250 | 0.473 | 0.696 | 0.528 | 95.5% |
| 300 | 0.617 | 0.607 | 0.617 | 100.0% |
| 350 | 0.714 | 0.509 | 0.715 | 99.9% |
| 400 | 0.751 | 0.425 | 0.799 | 96.1% |
| 450 | 0.786 | 0.375 | 0.849 | 94.9% |
| 500 | 0.822 | 0.344 | 0.88 | 95.3% |

Prophetic Example 9—Controlling Iron Concentration

A prophetic system features a copper solvent extraction plant with an iron extraction plant for iron control. A Cu-lean electrolyte (LE) continuously receives a total of 100 kg of iron per day or 69 grams per min, based on a flow rate of 18900 L/min electrolyte flow and 0.00365 gram per liter iron delta between the copper solvent extraction circuit LE and RE. In order to maintain the iron in the copper electrolyte, a portion of the copper electrolyte is removed from the copper solvent extraction circuit and sent to an iron solvent extraction circuit. The amount of iron removed is dependent on the amount of copper electrolyte treated by the iron solvent extraction circuit and the conditions of the iron solvent extraction circuit. A bleed stream of 138 liters per minute of LE is taken from the copper electrolyte and treated in an iron solvent extraction system containing a single extraction stage and strip stage.

In the extraction stage, the iron rich electrolyte is contacted with the iron extraction organic phase and the iron is transferred from the copper electrolyte to the organic iron extractant. The organic for the system was 21 g/L isooctyl acid phosphate and 20% (v/v) tridecanol in a Shellsol® D70 kerosene diluent. The copper electrolyte was sent back to the copper solvent extraction system after separation from the organic phase. The iron loaded organic is the sent to the strip stage where it was contacted with an aqueous strip solution and the iron is stripped from the iron loaded organic and transferred to the iron rich strip solution. The strip solution is 400 g/L sulfuric acid in process water. The stripped iron organic is then sent back to the iron extraction stage and the iron rich strip solution was sent to the copper heap or dump. The flow rates of the system are such that the organic to aqueous ratio of mixing is kept at 1:1 by keeping the organic and strip solutions flows at 138 liters per minute. Under these conditions, the iron loaded organic leaves the extraction stage loaded with 0.75 grams per liter of iron and left the strip stage with 0.25 grams per liter of iron resulting in a removal of iron from the electrolyte at a rate of 0.5 grams per liter per minute of iron. This results in the removal of iron from the electrolyte system at the same rate as it entered through chemical and physical transfer through the copper solvent extraction system. While the iron solvent extraction system is operating, the electrolyte is able to maintain its iron concentration at the desired level.

Below are the calculations of the exact flows calculated to maintain and reduce the iron in the electrolyte for this example. The net transfer the organic can achieve in the iron solvent extraction plant is calculated by the iron delta of the organic in iron extraction circuit. Where organic iron concentration after loading is $LO_{Fe}$, organic iron concentration after stripping is $SO_{Fe}$, and net transfer is NT:

$$LO_{Fe} - SO_{Fe} = NT$$

Ex. 0.75 g/L $Fe$ – 0.25$Fe$ = 0.5 g/L $Fe$

This must be then be multiplied by the organic to aqueous ratio O/A of extraction to determine the concentration of iron removed from the electrolyte Fe.

$$NT*O/A = Fe$$

Ex. 0.5 g/L $Fe$*1=0.5 g/L $Fe$

After calculation of how much iron can be removed from the electrolyte, it must be calculated how much electrolyte must be treated per minute by using grams of iron per minute $Fe_{Rate}$ and the Fe resulting in the volume of electrolyte to be treated $V_{treatment}$.

$$Fe_{Rate}/Fe = V_{treatment}$$

Ex. 69 g pre min/0.5 g per liter=138 liters per minute

Or the full equation as follows $$Fe_{Rate}/(LO_{Fe} - SO_{Fe})*(O/A) = V_{treatment}$$

The above shows that for the given example to maintain the iron at a constant value in this system 138 liter/min would need to be treated by the iron removal solvent extraction system. This value could be changed by changing any of the variables that contribute to how much iron the extractant can remove.

As mining operations change an increase or decrease of chemical and physical transfer of iron into the electrolyte may occur. To compensate for these changes the volume of electrolyte sent to the iron extraction plant must be adjusted accordingly. For example, an increase in iron was measured by the delta of the iron on the LE entering the copper solvent extraction circuit and the iron of the RE leaving the copper solvent extraction circuit. The level had increased to 78 grams of iron per minute, resulting in a need to increase the volume of copper electrolyte sent to the iron solvent extraction circuit from 138 to 156 liters per min to maintain the iron level in the electrolyte within the desired limits.

78 grams per min/(0.75 grams $Fe$ per liter–0.5 grams $Fe$ per liter)*(1)=156 liters per min.

The foregoing example demonstrates how adding an iron solvent extraction plant that is capable of removing the iron from the electrolyte can maintain the level of electrolyte iron at a desired level.

Example 10—Iron Transfer of Isotridecyl Alcohol with Tributylphosphate

Organics were made up with 50 gpl IOAP (67% diisooctyl hydrogen phosphate and 32% isooctyl dihydrogen phosphate available from Islechem) in SX-80 diluent and varying amounts of isotridecyl alcohol blend (TDA) and/or tributyl phosphate (TBP). Aqueous solutions were made in deionized water: a feed solution (35 gpl Cu, 3.238 gpl Fe and 160 gpl sulfuric acid) and strip solution (400 gpl sulfuric acid). 10 ml of each organic were placed in to 30 ml separatory funnels on an auto shaker and contacted with aqueous as follows:

1) Feed contact for 15 min
2) Feed contact for 15 min
3) Strip contact for 15 min
4) Water wash for 1 min
5) Feed contact for 15 min, aqueous saved for iron analysis
6) Water wash for 1 min
7) Strip contact for 15 min, aqueous saved for iron analysis Each contact was carried out at room temperature and the aqueous phase was removed after each contact and replaced with the next aqueous. Aqueous samples that were saved were analyzed for iron using atomic absorption spectroscopy. Table 12 below summarizes the TDA and TBP concentrations, analyzed iron values and visual observation of third phase formation (indication of limited solubility). Raffinate iron refers to the residual iron left in the feed solution after contact with the organic. Strip iron refers to the amount of iron removed from the organic by the strip solution after the strip contact.

TABLE 12

| Third Phase | TDA (mol/L) | TBP (mol/L) | Raffinate (g/L Fe) | Strip (g/L Fe) | Iron loaded |
|---|---|---|---|---|---|
| yes | 0.00 | 0.18 | 1.943 | 1.333 | 1.295 |
| yes | 0.00 | 0.37 | 2.182 | 1.062 | 1.056 |
| yes | 0.00 | 0.74 | 2.57 | 0.621 | 0.668 |
| yes | 0.00 | 1.10 | 2.718 | 0.416 | 0.52 |
| no | 0.21 | 0.00 | 1.967 | 1.19 | 1.271 |
| no | 0.43 | 0.00 | 1.9 | 1.263 | 1.338 |
| no | 0.85 | 0.00 | 1.917 | 1.25 | 1.321 |
| no | 1.28 | 0.00 | 2.113 | 1.062 | 1.125 |
| no | 0.21 | 0.18 | 1.806 | 1.373 | 1.432 |
| no | 0.43 | 0.18 | 1.816 | 1.345 | 1.422 |
| no | 0.85 | 0.18 | 1.916 | 1.224 | 1.322 |
| no | 1.28 | 0.18 | 2.107 | 1.028 | 1.131 |
| no | 0.21 | 0.37 | 2.042 | 1.163 | 1.196 |
| no | 0.43 | 0.37 | 2.093 | 1.113 | 1.145 |
| yes | 0.85 | 0.37 | 2.207 | 0.982 | 1.031 |
| yes | 0.21 | 0.74 | 2.54 | 0.602 | 0.698 |
| yes | 0.43 | 0.74 | 2.582 | 0.596 | 0.656 |
| yes | 0.21 | 1.10 | 2.815 | 0.347 | 0.423 |

Figure 7:
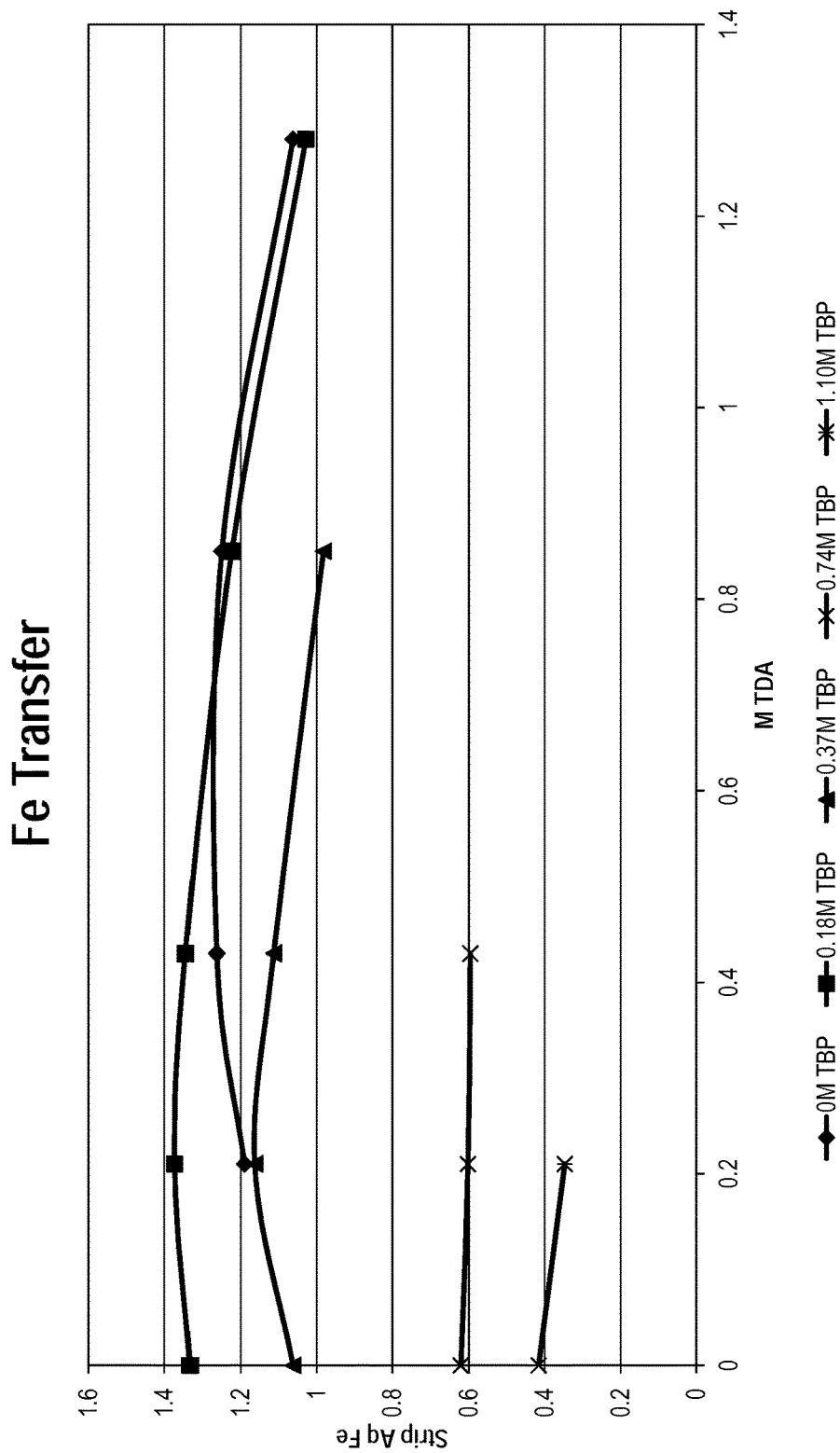
FIG. 7 is a graph showing the iron transfer of several extractants in accordance with one or more embodiments of the invention.

FIG. 7 is a plot of the iron transfer of each organic, or how much iron was loaded onto the organic in a single contact and then stripped of the organic in a single contact, as a function of modifier content and blend. The higher iron transfer indicating a more desirable formulation. The graph illustrates the benefit of the blend of the modifiers used in a modifier molar ratio of 0.25-4 of TDA to TBP. It can be seen that some blends (Ex. 0.18M TBP and 0.21M TDA) have a higher iron transfer than that of the blends containing any amount of either TDA or TBP alone.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of controlling an iron concentration in a copper extraction system, wherein the copper extraction system comprises a copper electrowinning station, the method comprising:
   a. introducing a copper rich electrolyte into the copper electrowinning station and removing a copper lean electrolyte from the copper electrowinning station;
   b. determining an iron transfer to the copper electrowinning station;
   c. removing a bleed portion of the electrolyte solution from the copper electrowinning station at a bleed stream rate, and introducing the bleed portion into a solution comprising an organic solvent and an iron extraction agent, wherein the iron extraction agent is a monoalkyl phosphate ester having a structure represented by:
   where $R^1$ comprises a linear, branched or cyclic alkyl or aryl group, and $R^2$ and $R^3$ are each H, and
   wherein contacting the bleed portion with the solution provides an iron-loaded organic;
   d. determining an iron removal of the iron extraction stage, wherein the bleed stream rate is proportional to the ratio of the iron transfer and the iron removal;
   e. stripping the iron from the iron-loaded organic into an iron-rich strip solution; and
   f. leaching copper ore with the iron-rich strip solution.

2. The method of claim 1, wherein determining the iron transfer comprises measuring difference in iron concentration entering and exiting the copper electrowinning station.

3. The method of claim 1, wherein the copper extraction system further comprises an extraction stage in which copper is extracted into an organic phase to provide a loaded organic, and a strip stage in which copper is stripped from the organic phase to provide a stripped organic, and determining the iron transfer comprises calculating the sum of: a. an iron strip rate determined by the difference in iron concentration between the loaded organic and the stripped organic; and b. an iron entrainment rate determined by an iron concentration in an aqueous entrainment in the organic phase.

4. The method of claim 1, wherein the iron transfer is an iron amount per unit of time, an iron amount, an iron concentration or an iron concentration per unit of time.

5. The method of claim 1, wherein the iron removal is an iron amount per unit of time, an iron amount, an iron concentration or an iron concentration per unit of time.

6. The method of claim 1, wherein $R^1$ is a branched or linear $C_6$-$C_{12}$ alkyl group.

7. The method of claim 6, wherein the monoalkyl phosphate ester comprises iso-octyl phosphoric acid, 2-ethylhexyl phosphoric acid, octophenyl phosphoric acid or nonylphenyl phosphoric acid.

8. The method of claim 1, further comprising contacting the bleed portion with a modifier.

9. The method of claim 8, wherein the modifier comprises a $C_8$-$C_{16}$ linear, branched or cyclic or aryl alcohol.

10. The method of claim 1, wherein the extraction agent further comprises a dialkyl phosphate ester.

* * * * *